United States Patent [19]
Vayssiere et al.

[11] 3,902,611
[45] Sept. 2, 1975

[54] DEVICE FOR INTRODUCING SOLID PRODUCTS INTO A RECEPTACLE FOR TREATMENT OF A METALLIC BATH

[75] Inventors: Pierre Vayssiere; Aristide Berthet, both of Metz, France

[73] Assignee: Institut de Recherches de la Siderurgie Francaise, St. Germain-en-Laye, France

[22] Filed: Mar. 19, 1973

[21] Appl. No.: 342,679

[30] Foreign Application Priority Data
Mar. 23, 1972 France .............................. 72.10140

[52] U.S. Cl. .................. 214/23; 214/18 SC; 266/35
[51] Int. Cl. ............................................. B66c 17/08
[58] Field of Search ...... 214/23, 35 R, 18 SC, 18 R, 214/25; 266/33 R, 33 S, 35

[56] References Cited
UNITED STATES PATENTS
1,483,278 2/1924 Carey.................................... 214/23
2,402,498 6/1946 Kohlhepp.......................... 266/33 R
2,624,565 1/1953 Kompart............................ 214/18 R
3,206,047 9/1965 Rosenak........................... 214/18 SC
3,405,821 10/1968 Slesaczek............................... 214/26

Primary Examiner—Robert G. Sheridan
Assistant Examiner—Gary Auton
Attorney, Agent, or Firm—Burgess, Ryan and Wayne

[57] ABSTRACT

A device for introducing solid products such as scrap iron into a receptacle provided with a siphon. The device comprises a retractile feeding member for introducing the products into a metal bath in the siphon, and a pusher movable along the axis of said conduit for advancing the solid products that have been introduced toward the interior of the receptacle. The above two operations follow each other sequentially. The device is used for loading scrap iron in a continuous refining installation for the production of steel.

2 Claims, 1 Drawing Figure

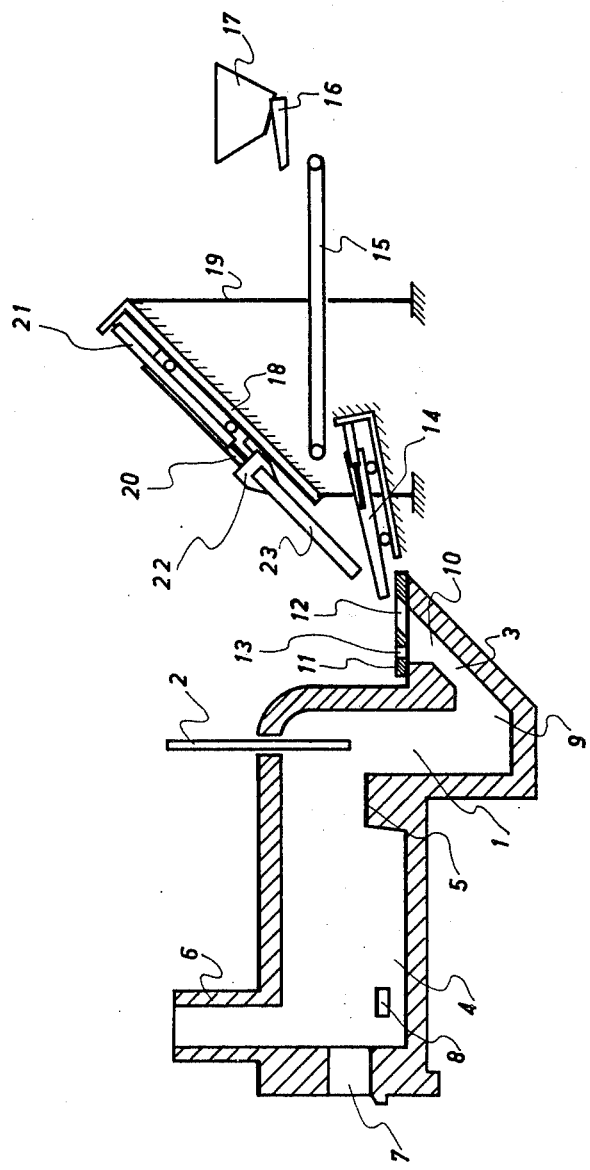

3,902,611

DEVICE FOR INTRODUCING SOLID PRODUCTS INTO A RECEPTACLE FOR TREATMENT OF A METALLIC BATH

This invention relates to a device for loading solid products rich in iron, especially scrap iron, into a treatment receptacle of a metallic bath, wherein a volume of liquid metal is externally connected by way of a conduit in the form of a siphon.

It is well known to effect metallurgic operations on a liquid metal bath contained in a treatment receptacle, the liquid metal being for example, a melt that is to undergo a refining treatment. Certain treatment receptacles are fed with the melt through a siphon, for example, in the case of a reactor of continuous refiner. Although these receptacles can be exclusively fed with liquid metal to be refined, it is also desirable to introduce metallized solid products in said receptacles. This is in particular the case of the recovery of scrap iron and shavings for the purpose of using them in a refining installation. The introduction and fusion of scrap iron in receptacles operating on a batch basis, for instance, in converters, can be easily effected due to the discontinuous and sequential nature of the different operations that are carried out. However, the case is different in the introduction and fusion of scrap iron in a receptacle of continuous treatment of a metallic bath. By reason of the dynamic and continuous nature of the operations effected in such a receptacle, it becomes in fact necessary simultaneously to start with the fusion of the solid products that have been introduced and with the operations of introduction of liquid metal into the receptacle of treatment of the metallic bath and discharge of the treated metal without disturbing the thermal and dynamic balance of the process of treatment.

It is an object of the invention to provide a solution to said problems and to permit the fusion of solid products rich in iron in a receptacle of treatment of a metallic bath and in particular a receptacle for the continued production of steel.

In accordance with the invention, a device is provided for introducng solid products rich in iron, especially scrap iron, into a receptacle of continuous treatment of a metallic bath, provided with a slanted conduit in the form of a siphon that communicates with the lower portion of said receptacle. The device includes a retractable feeding member for introducing the solid products into said conduit and a pusher movable along the axis of the conduit to advance the products that have been introduced toward the interior of the receptacle of treatment, the feeding member and said pusher being operated sequentially.

The device according to the invention makes it possible to introduce solid products rich in iron, for example, scrap iron, into a metallic bath beneath the surface of the metallic bath and not putting them on the surface of said bath or near said surface as it had been commonly done. By permanently keeping an excess of solid products in solid state, inside the metallic bath, it is possible, in addition, to carry out a continuous fusion of said products, which permits the simultaneous continuous treatment of the metallic bath.

The invention will now be more fully disclosed with reference to the description given by way of example in relation to the single FIGURE of the enclosed drawing. The drawing represents a view in partial section of an installation for continuous treatment of a liquid metal including a receptacle to which solid products are fed by means of a device according to the invention, said receptacle being a reactor of a continuous refining installation.

The FIGURE diagrammatically shows an installation for continuous refining comprising a reactor 1 for the continuous treatment of a liquid melt by blowing the refining products by means of a nozzle 2 in order to produce steel. The reactor is provided with a siphon 3 forming a shaft of liquid melt. The reactor is of elongated vertical shape so as to constitute permanently a volume of liquid metal that communicates with the atmosphere by way of the siphon 3. The products resulting from the refining treatment continuously flow into a decantation vessel or decanter 4 adjacent the reactor and separated from the latter by a partition 5. The decanter includes a funnel 6 for collecting the gases formed during the treatment operation, and two openings 7 and 8 for the respective discharge of the metal and of the slag that are in the decanter. The siphon 3 has the configuration of an inclined shaft of general quadrangular cross section. A downwardly extending enlarged portion 9 of the siphon discharges in the lower section of the reactor, and an upwardly extending enlarged portion 10 is open to the atmosphere. The upper end of the siphon is partially sealed by a cap 11 having an orifice 12 of general quadrangular cross section. The function of said orifice will be specified further on. The cap 11 also has an orifice 13 for introducing the liquid melt coming from a mixer in the shaft of the siphon. The upper end of the shaft is situated at a higher level than that of the liquid metal in the reactor while remaining at a level lower than that of the partition 5 that separates the reactor from the decanter.

A retractable vibrating channel 14 is disposed in the proximity of the siphon so that in the feeding position the spout of said channel is disposed above the orifice 12. Said channel is fed in its non-retracted position by a conveyor belt 15. The belt 15 is loaded with roughly gauged scrap iron coming from a hopper 17 by means of an extracting device 16. A slanted slide 18 integral with a cross-bar 19 and including a movable carriage 20 moved by a hydraulic jack 21 is arranged above the scrap iron feeding apparatus constituted by the conveyor belt and the vibrating channel. The axis of said slide coincides with the axis of the shaft of the siphon 3. A mechanical or hydraulic grip 22 is secured to the lower end of the movable carriage 20. A pusher 23 having a generally parallelepipedal shape is inserted into the grip at one of its ends and is clamped therein so that the longitudinal axis of the pusher coincides with the axis of the slide. The lower end of the pusher is consequently opposite the orifice 12 in cap 11. The pusher is made of a material of the same kind as that of the solid products that are introduced, such as, for instance, of a steel slab. In case of an eventual partial fusion of said slab, the introduction in the metallic bath of undesirable products is thus avoided. Such a slab must be easily renewable. The end of the slab can be periodically submitted to flame cutting operations to preserve the general initial cross section of the pusher. The travel of the carriage is such that at the maximum extension of the hydraulic jack 21 the pusher is inserted into the inclined shaft of the siphon and passes through the orifice 12 so that the lower portion of said pusher is situated in the proximity of the periphery of the lower internal portion of the refining reactor. The motion controls of the vibrating channel 14, of the conveyor belt 15, of the extracting device 16 and of the carriage 20 are made interdependent by a synchronization means of a type well known in the art, such as a device of contactors that are released by circuit breakers coupled to detect the positions of the devices, and that control by means of delay relays the different movements of said members in a manner that will be explained below.

The mode of operation of the above described installation will now be explained.

The liquid melt is introduced continuously into the shaft of the siphon so as to maintain a predetermined mean level of liquid metal in the refining reactor. Through its spout, the vibrating channel is unretracted in position progressively pours a volume of scrap iron into the shaft per unit of time determined in accordance with the geometric particulars of the reactor and with thermal considerations associated with the operations that are effected here. During the introduction of scrap iron into the shaft, the pusher is lifted. A recurrent signal from a conventional control system (not shown) simultaneously releases the stop of the extracting device and of the conveyor belt at regular time intervals. The time period is determined according to the supply of scrap iron that can be introduced into the reactor; this signal also controls the return of the vibrating channel to the retracted position after a certain period of time fixed by a retardation relay, said channel having poured in the shaft during said period of time the scrap iron that it contained at the moment the conveyor belt stopped. A control stop (not shown) disposed at the lower end of the channel releases the pusher to descend by the action of the jack 21 on the carriage 20. The pusher penetrates into the shaft of the siphon 3 and exerts a mechanical force on the scrap iron so as to advance said scrap iron toward the interior of the reactor. Then the pusher ascends movement to a higher position, a movement that is released by a control stop situated on the slide. The rise of the pusher in the shaft of the siphon produces an aspiration of liquid metal contained in the reactor, which causes a partial renewal of the liquid metal in the siphon. At the end of the ascending path, the carriage releases directly, or eventually by means of conventional delay relay, the movement of the vibrating channel into an advanced position to restart the conveyor belt and the extracting device. The scrap iron introduced through the siphon into the reactor dilutes in the volume of metal contained in said reactor by continuous fusion, the amount of scrap iron being renewed consecutively so as to maintain permanently in the reactor an excess of scrap iron in solid state. The volume of scrap iron cast by time unit essentially depends on the temperature of the liquid metal in the reactor. The volume of liquid metal in the reactor forming a thermal reserve supply, the volume of scrap iron cast by time unit is consequently established by a substantially constant value. The supply of liquid melt and the mean delivery of scrap iron, which itself depends on the instantaneous supply and on the frequency of the recurring signal, are in addition determined so as to maintain the level of liquid metal in the reactor between two predetermined values compatible with the refining operations effected in the reactor and depending on the height of the partition that separates the reactor from the decanter. The maximum value of the volume of scrap iron in the reactor at any moment is on the other hand limited according to the thermal balance of the dilution operation so as to maintain the liquid metal in the reactor at a temperature compatible with the refining operations. The above cited parameters are characteristic of the refining installation and can be specifically adjusted by acting on the value of the instantaneous supply of scrap iron, on the value of the liquid melt supply and on the frequency of the recurring signal that releases the consecutive operations of charging and introducing the scrap iron.

It must be understood that the introduction of liquid melt in the receptacle through a siphon different from the shaft of introduction of scrap iron constitutes a variation in the mode of operation within the limits of the process according to the invention.

The device according to the invention makes it possible to introduce solid materials rich in iron, in particular scrap iron, into a receptacle during the continuous treatment of a bath of liquid metal contained in said receptacle. The device is especially useful for introducing and fusing scrap iron in a reactor of an installation of continuous refining. It can likewise be used in the introduction of solid products rich in iron into any receptacle of a metallic bath for the continuous fusion or the discontinuous fusion of discrete amounts of said products.

What is claimed is:

1. In a device for introducing solid products rich in iron, in particular scrap iron, into a receptacle for the continuous treatment of a metallic bath; the improvement wherein said receptacle comprises a reaction chamber and a slanted conduit extending upwardly and outwardly from the bottom of said chamber and communicating therewith, whereby said slanted conduit is at least partially filled with said metallic bath, a retractable feeding member mounted to introduce said solid products into the top of said conduit, and a pusher mounted to be movable along the axis of said conduit between an upper position external of said conduit and a lower position within said conduit, said pusher being of such length as to extend below the surface of said metallic bath in said lower position, and to be above said metallic bath in said upper position, said pusher advancing the products that have been introduced into the conduit downwardly into the interior of said treatment receptacle, such that said pusher extends into said metallic bath to deposit the solid products below the surface of the bath, said feeding member and said pusher being adapted for consecutive movement.

2. A device according to claim 1, wherein said pusher is made of a material of the same kind as said solid products.

* * * * *